United States Patent [19]
Falcione et al.

[11] 4,230,610
[45] Oct. 28, 1980

[54] POLYACRYLATE PIGMENT DISPERSANTS FOR MAGNESIUM OXIDE

[75] Inventors: Ronald J. Falcione, Canonsburg; Ronald R. McManis, Washington; Joseph A. Aufman, Pittsburgh, all of Pa.

[73] Assignee: Calgon Corporation, Pittsburgh, Pa.

[21] Appl. No.: 63,023

[22] Filed: Aug. 1, 1979

[51] Int. Cl.³ .............................................. C08L 33/02
[52] U.S. Cl. ................................................ 260/29.6 M
[58] Field of Search .................................. 260/29.6 M

[56] References Cited

U.S. PATENT DOCUMENTS

| | | | |
|---|---|---|---|
| 4,089,831 | 5/1978 | Chambers | 260/29.6 M |
| 4,154,717 | 5/1979 | Kohmura | 260/29.6 M |
| 4,169,824 | 10/1979 | Kane | 260/29.6 M |
| 4,174,334 | 11/1979 | Bertenshaw | 260/29.6 M |
| 4,175,066 | 11/1979 | Shibazaki | 260/29.6 M |

*Primary Examiner*—Paul R. Michl
*Attorney, Agent, or Firm*—Mario A. Monaco; Martin L. Katz

[57] ABSTRACT

Use of polyacrylates to reduce slurry viscosity and permit utilization of higher solids slurries of magnesium oxide.

1 Claim, No Drawings

POLYACRYLATE PIGMENT DISPERSANTS FOR MAGNESIUM OXIDE

This invention relates to the use of pigment dispersants for magnesium oxide.

More particularly, this invention relates to the use of polyacrylates as dispersants which reduce the viscosity of magnesium oxide, thereby permitting the storage and pumping of higher solids slurries of magnesium oxide.

Magnesium oxide and other pigments are used in the manufacture of paper and are used and pumped as aqueous slurries in various industrial applications, such as low-temperature corrosion prevention or in the manufacture of magnesium oxide itself. The slurries are eventually dewatered at a substantial energy cost. Thus, an agent which permits the use of higher solids slurries, i.e. less water, is of substantial value. Whe have found that poly(arcrylic acid) neutralized to a pH of from about 8.0 to about 12.0 with bases such as sodium or ammonium hydroxide is an effective dispersant for magnesium oxide.

The polyacrylates useful in the present invention have a molecular weight in the range of from 400 to 20,000, preferably from 700 to 10,000. These polymers may be prepared by conventional solution or emulsion polymerization processes and are used in concentrations of from 0.1 to 5.0 percent, preferably 0.3 to 3.5 percent.

This invention will be better understood by the following example.

EXAMPLE 1

A 500 ml sample of well mixed slurry containing 41.6 percent by weight of magnesium oxide is prepared and the viscosity is measured using a Model RVF viscometer. The sample is placed under a dispersator and the speed is adjusted to obtain a vortex. This speed is used for all tests. The dispersant is added at the desired amount and mixed for 30 minutes while the speed is adjusted to maintain approximately the same vortex. After the 30-minute mixing cycle, the viscosity is again measured using the Model RVF viscometer. The sample is set aside and the viscosity is remeasured after 24 hours. The results of this test are set forth in the following table.

TABLE I

| Dispersant Used | Percent Added* | Initial Slurry Viscosity (CPS) | Viscosity After 30 Minutes (CPS) | Viscosity After 24 Hours (CPS) |
| --- | --- | --- | --- | --- |
| None | — | 9400 | — | — |
| Alcosperse 149 | 0.6 | — | 8000 | — |
| Alcosperse 149 | 1.5 | — | 2700 | — |
| Alcosperse 149 | 2.0 | — | 1000 | 1500 |
| Alcosperse 149 | 3.0 | — | 1300 | — |
| None | — | 9500 | — | — |
| CL-4000 (Neut.) | 1.0 | — | 6400 | — |
| CL-4000 (Neut.) | 2.0 | — | 1700 | — |
| CL-4000 (Neut.) | 3.0 | — | 1300 | 1300 |
| CL-4000 (Neut.) | 4.0 | — | 1900 | — |

Alcosperse 149 is a sodium polyacrylate distributed by Alco Chemical Corporation.
CL-4000 is a sodium polyacrylate (after neutralization) distributed by Calgon Corporation.
*Based on active slurry solids.

We claim:

1. A method for reducing the slurry viscosity of magnesium oxide aqueous slurries which comprises maintaining in the slurry from 0.1 to 5.0 percent of a polyacrylic acid which has been neutralized to a pH of from about 8.0 to about 12.0.

* * * * *